United States Patent [19]
Giorgini

[11] Patent Number: 5,530,085
[45] Date of Patent: Jun. 25, 1996

[54] ISOCYANATE FUNCTIONAL PHASE-STABLE MDI/POLYDIENE URETHANE PREPOLYMER PREPARED BY LOW TEMPERATURE REACTION

[75] Inventor: Albert Giorgini, Maplewood, Minn.

[73] Assignee: H. B. Fuller Licensing & Financing, Inc., Arden Hills, Minn.

[21] Appl. No.: 105,415

[22] Filed: Aug. 12, 1993

[51] Int. Cl.$^6$ .................................................. C08G 18/62
[52] U.S. Cl. ........................ 528/59; 528/65; 528/67; 528/75; 528/85
[58] Field of Search ............... 528/59, 65, 67, 528/75, 85

[56] References Cited

U.S. PATENT DOCUMENTS

| | | | |
|---|---|---|---|
| 2,877,212 | 3/1959 | Seligman | 525/123 |
| 3,338,861 | 8/1967 | Mastin et al. | 524/773 |
| 3,714,110 | 1/1973 | Verdol et al. | 524/848 |
| 4,234,714 | 11/1980 | Earing et al. | 528/67 |
| 5,077,349 | 12/1991 | Fehlbier et al. | |
| 5,212,275 | 5/1993 | Slack et al. | 528/67 |

FOREIGN PATENT DOCUMENTS

0504436A1  9/1992  European Pat. Off. .

*Primary Examiner*—James J. Seidleck
*Assistant Examiner*—John M. Cooney, Jr.
*Attorney, Agent, or Firm*—Vidas, Arrett, & Steinkraus

[57] ABSTRACT

Non-pearlescent, single phase, low viscosity, solvent-free isocyanate functional urethane prepolymer compositions from hydroxy-terminated diene polymers and excess diphenylmethane diisocyanate are obtained at reaction temperatures of 100° C. or less when the diphenylmethane diisocyanate used in the composition includes at least 20% of the isomer 2.4'-diphenylmethane diisocyanate.

23 Claims, No Drawings

ISOCYANATE FUNCTIONAL PHASE-STABLE MDI/POLYDIENE URETHANE PREPOLYMER PREPARED BY LOW TEMPERATURE REACTION

BACKGROUND OF THE INVENTION

Isocyanate terminated urethane prepolymers are widely used, for instance in liquid moisture curable adhesives and sealants, and as crosslinkers in two component adhesives and sealants. They are also used in the manufacture of hot melt moisture curable adhesives (HMMC). The typical procedure for making isocyanate prepolymers with aromatic polyisocyanates, such as toluene diisocyanate or methylene diphenyl diisocyanate (MDI), and a polyol is usually accomplished at relatively low process temperatures of 70° to 100° C. However, prepolymers made with the conventional 4,4'-MDI isomer, i.e. 4,4'-diphenylmethane diisocyanate, and hydroxy terminated polybutadiene at these process temperatures are hazy, pearlescent (a sign of incompatibility) products which phase separate at room temperature.

In U.S. Pat. No. 4,234,714 a process for making prepolymers with hydroxy terminated diene polymers with aromatic isocyanates is described. Following the process of this reference, prepolymers based on hydroxy terminated liquid diene polymers and normally liquid relatively non-volatile aromatic polyisocyanates, such as trihydrocarbyl phosphate-modified methylene-bis-(phenylisocyanate) and polyarylene polyisocyanate, are made at a temperature above about 150° C. for 1 to 4 hours. The resulting prepolymer is said to resist the tendency to form multiple phases or layers upon storage at room temperature. However, 4,4'-MDI prepolymers made by this process still has some hazy pearlescence, a sign of incompatibility.

A major disadvantage of the process of U.S. Pat. No. 4,234,714 is the extremely high process temperature required to make a phase stable prepolymer. The high temperature limits the production potential of the process. At high temperatures the polydiene polymers can homopolymerize, which increases the molecular weight of the polymer and the solution viscosity, and in extreme cases can gel the product. In addition, the high process temperature can cause the isocyanate to undergo dimerization, or form allophanates, which would also cause the solution viscosity to increase.

There is therefore a need for a phase-stable, liquid, MDI-based isocyanate functional polydiene prepolymer which can be prepared at much lower temperatures, desirably at 100° C. or less, and which does not produce phase separation or pearlescence at ambient temperature storage.

SUMMARY OF THE INVENTION

The invention in one aspect is a solvent-free isocyanate functional urethane prepolymer composition prepared from MDI and a hydroxy terminated polydiene, which may be prepared at a process temperature of 100° C. or less and yet be characterized as a clear, or nearly clear, stable, low viscosity, single phase composition upon storage at room temperature. The key to the inventive prepolymer composition is that the MDI used in making the composition is high in the 2,4'-MDI isomer, i.e. 2,4'-diphenylmethane diisocyanate. By using an MDI having 20% or more of 2,4'-MDI, the isocyanate's compatibility with the hydroxy terminated polydiene portion of the prepolymer is significantly improved.

The lower process temperature makes production of isocyanate functional diene prepolymers much easier. Thus, a further aspect of the invention comprises the process of forming an isocyanate prepolymer of an MDI isocyanate and a hydroxy terminated polydiene at a temperature of 100° C. or less, suitably 70° C. –100° C., wherein the MDI isocyanate has a 2,4'-MDI content of about 20% or higher.

A particular advantage of the lower temperature preparation is that the resulting prepolymer compositions have a lower viscosity than compositions prepared from the same ingredients at the higher temperatures of U.S. Pat. No. 4,234,714. This is believed to be due to a reduction in side reactions of the diene polymer and/or the isocyanate groups.

DETAILED DESCRIPTION OF THE INVENTION

The isocyanate used in making prepolymer compositions of the invention is an MDI which contains at least 20% of 2,4'-diphenylmethane diisocyanate, based on the total content of MDI in the prepolymer composition. Preferably the 2,4'-MDI content of the composition is at least 22%, and still more preferably at least 30%. The remaining isocyanate used in preparing the composition may suitably be the much more widely available 4,4'-diphenylmethane diisocyanate isomer, which may optionally contain a minor amount of a non-reactive modifier, such as a trialkyl phosphate, which prevents crystallization of the diisocyanate. Commercial MDI products containing high levels of 2–4'-MDI are sold under the trademarks Mondur® ML (50–60% 2,4-MDI) Mondur® MRS-2 (22% 2,4'-MDI), both sold by Miles Laboratories, Inc., and Rubinate® 9225 (20% 2,4'-MDI), sold by ICI. These products may suitably be used alone or blended with other 4,4'-MDI products, provided that the minimum 20% equivalents basis 2,4'-isomer is maintained.

The prepolymer composition of the invention is isocyanate functional, i.e. the number of equivalents of isocyanate used to prepare the composition exceeds the number of equivalents of hydroxy groups present on the diene polymer and any other hydroxy functional compound used in preparing the prepolymer. Desireably the final composition contains at least 2.5% NCO, preferably at least 10% free NCO, even more preferably 13–18% NCO.

In preparing the prepolymer composition it is preferred to react an MDI isomer blend having the desired 2,4' isomer content with the hydroxy terminated diene polymer in a single step at a temperature of about 70°–100° C., the reaction mixture containing an excess quantity of isocyanate as required to produce the desired level of NCO in the final prepolymer composition. However, it has been found that this reaction procedure is not required in order to produce phase stable clear compositions. Thus, it is possible to produce a pearlescent prepolymer of a 4,4'-MDI (for instance by the procedure of U.S. Pat. No. 4,234,714), the prepolymer having less than the desired final NCO content, and then to blend a sufficient amount of a high 2,4'-MDI product at 70°–100° C. such that the final composition has the desired level of free isocyanate and at least 20% of the total MDI used in preparing the final composition is 2,4' isomer. Regardless of how the prepolymer is prepared, however the final product should be free of solvent.

The hydroxy-terminated diene polymer component used to prepare the inventive prepolymer compositions may be the only polyhydroxy reactant utilized, although other polyhydroxy compounds may also be present in minor amounts based on total polyhydroxy component reacted. The useful hydroxy diene polymers contain a relatively long, essentially hydrocarbon chain due to the polymerization of a conjugated diene of 4–8 carbon atoms, with or without additional monomers. The diene polymers are generally in the form of viscous oils, i.e., they are normally liquid, at ambient temperature. Hydroxy-terminated diene polymers of the type disclosed in U.S. Pat. No. 4,234,714 at columns 4–6, incorporated herein by reference, may be employed in the products of the invention. Especially suitable diene polymers are hydroxy terminated liquid polybutadienes having molecular weights from about 700 to 12,000, more preferably 1,000–5000. An example of a suitable diene polymer is POLY BD-45 HT, a homopolymer of butadiene made by Elf Arcochem North America, Inc., having a viscosity of 50 poises at 30° C. and a hydroxyl value of 0.83. If desired, the diene polymer may be partially hydrogenated.

The reduced level of side reactions occuring at the lower temperatures used in the inventive process produces compositions which are much lower in viscosity than compositions prepared from the same ingredients using temperatures as taught by U.S. Pat. No. 4,234,714. For instance, using diene polymers of MW 2,000 or higher, viscosities of less than 3,000 mPa. s (25° C.) can readily be obtained with 16–17% free NCO and less than 5,000 mPa. s with 14–15% free NCO.

The isocyanate functional prepolymer compositions of the present invention may be usefully employed in liquid moisture curable adhesives and sealants and as crosslinkers in two component adhesives and sealants. They may also have advantages in hot-melt moisture cureable adhesives. They demonstrate significant improvement over prepolymers make with 4'4-MDI and hydroxy terminated polybutadiene in compatibility, phase stability, clarity, have lower viscosity for easy of use, give longer work life, and better specific adhesion. Properly compounded adhesives made with these materials will exhibit excellent aqueous chemical resistance to strong acidic and basic solutions, good hydrolytic stability, low moisture permeability (which would reduce foaming in the adhesive) and maintain excellent flexibility. These characteristics are especially beneficial in the manufacture of reverse osmosis filters, but there are many other applications for which those skilled in the art will find the inventive compositions useful.

The invention is illustrated by the following non-limiting examples.

EXAMPLE 1

A prepolymer composition was made by adding Mondur® ML (50%–60% 2,4'-MDI, eq. wt. 128), 56.6 parts by weight, to a glass reactor vessel. Poly BD 45 HT (eq. wt. 1247), 43.3 parts by weight, was then added to the vessel. The mixture was stirred under nitrogen for 10 minutes at room temperature then heated up to 100° C. and held there for 3 hours. Heating was then discontinued and a vacuum (>28" Hg) was pulled for ½ hour to remove bubbles. The percent NCO was then checked (16.83%). The sample was then poured into a quart can. After 24 hours at room temperature, the sample was still clear, stable, single phase and low in viscosity (1760 mPa.s, 25° C.).

EXAMPLE 2

The procedure of Example 1 was repeated except that the reaction temperature was 70° C. The resulting product was substantially the same in appearance, NCO content (16.9%) and viscosity (1680 mPa.s).

EXAMPLE 3 (Comparative Example)

The procedure of Example 1 was repeated except that the reaction temperature was 170° C. The resulting product was clear, stable, single phase the NCO content was 16.4% and the viscosity was double that of the previous examples (3400 mPa.s).

EXAMPLE 4

Rubinate 1680, a 4,4'-MDI product containing a minor amount of a phosphate crystallization retarder (eq. wt. 143), 306.2 parts by weight, was reacted with 443.8 parts Poly BD-45 HT at 170° C. for 2½ hours and then cooled to 100° C. The prepolymer had a measured NCO content of 9.5% (10.0 % theoretical) and was observed to be hazy and pearlescent at ambient temperature. To the prepolymer mixture at 100° C. was added 200 parts by weight of Mondur ML, bringing the content of 2,4-MDI to 22% of the total MDI used in the composition. The resulting isocyanate prepolymer composition had a measured NCO content of 14.1%, a viscosity at 25° C. of 29,400 mPa.s, and had cleared up so that there was only a very slight sign of cloudiness at room temperature.

EXAMPLE 5

Mondur MRS-2, a MDI product having 22% 2,4' isomer (eq. wt. 128), 50.8 parts, was reacted for 3.25 hours at 82° C., degassing the mixture for the last ¾ hour. The product had a dark but clear appearance upon returning to ambient temperature, a measured NCO content of 14.9% and a viscosity of 7,600 mPa.s.

EXAMPLE 6 (Comparative Example)

Mondur MRS, an MDI product having 14% 2,4' isomer (eq. wt. 131.3), 52 parts, was reacted for 2 hours at 88° C. with 48 parts Poly BD-45 HT, degassing the mixture for the last hour. The product had an opaque pearlescent appearance upon returning to ambient temperature and a measured NCO content of 13.0%.

EXAMPLE 7 (Comparative Example)

Rubinate 9372, a MDI product having 8–12% 2,4' isomer (eq. wt. 134.2), 424 parts, was reacted for 2 hours at 93° C. with 376 parts Poly BD-45 HT, degassing the mixture for the last hour. The reaction mixture remained cloudy throughout the reaction. At the end of the two hour reaction period the NCO content was measured at 12.9%. An additional 78 parts Rubinate 9372 was then added and stirred under vacuum for 15 min. The final product had an cloudy pearlescent incompatible appearance upon returning to ambient temperature and a measured NCO content of 14.8%. Viscosity 16,400 mPa.s, 25° C.

EXAMPLE 8 (Comparative Example)

Rubinate 9258, a MDI product having 10% 2,4' isomer (eq. wt. 132.1), 418 parts, was reacted for 2 hours at 93° C. with 382 parts Poly BD-45 HT, degassing the mixture for the last hour. The reaction mixture appeared clear during the last hour of reaction. At the end of the two hour reaction period the NCO content was measured at 13.2%. An additional 58 parts Rubinate 9372 was then added and stirred under vacuum for 15 min. The final product had an cloudy pearlescent incompatible appearance upon returning to ambient temperature and a measured NCO content of 15.1%. Viscosity 8,400 mPa.s, 25° C.

EXAMPLE 9

Rubinate 9225, a MDI product having 20% 2,4' isomer (eq. wt. 135.5), 478 parts, was reacted for 2 hours at 88° C. with 372 parts Poly BD-45 HT, degassing the mixture for the last hour. The reaction mixture appeared clear upon reaching reaction temperature. At the end of the two hour reaction period the NCO content was measured at 14.35%. The final product was nearly clear, only a very slight cloudiness being present. Viscosity 3,700 mPa.s, 25° C.

What is claimed is:

1. A prepolymer composition, the composition being solvent-free and substantially clear, the prepolymer being a urethane prepolymer, the urethane prepolymer having excess isocyanate groups, the urethane prepolymer being the reaction product of diphenylmethane diisocyanate (MDI) and a hydroxy-terminated conjugated diene polymer at a temperature of 100° C. or less, the MDI comprising at least 20% 2,4'-MDI isomer.

2. A prepolymer composition as in claim 1 wherein said hydroxy-terminated diene polymer is a hydroxy-terminated polybutadiene.

3. A prepolymer composition as in claim 2 wherein the hydroxy-terminated polybutadiene polymer has a molecular weight of about 700 to 12,000.

4. A prepolymer composition as in claim 3 wherein the molecular weight of said hydroxy-terminated polybutadiene polymer is about 1000 to 5000.

5. A prepolymer composition as in claim 1 wherein said MDI comprises at least 22% 2,4'-MDI.

6. A prepolymer composition as in claim 5 wherein said MDI comprises at least 30% 2,4'-MDI.

7. A prepolymer composition as in claim 6 wherein said hydroxy-terminated diene polymer is a hydroxy-terminated polybutadiene having a molecular weight of about 1000 to 5000 and wherein the excess isocyanate groups are present at a level of 13–18%.

8. A prepolymer composition as in claim 1 wherein the excess isocyanate groups are present at a level of at least 2.5% by weight.

9. A prepolymer composition as in claim 7 wherein the isocyanate groups are present at a level of at least 10%.

10. A prepolymer composition, the composition being solvent-free and substantially clear, the prepolymer being a urethane prepolymer, the urethane prepolymer having an isocyanate group content of 16–17 weight percent and a viscosity at 25° C. of no more than 3,000 mPa.s, the urethane prepolymer being the reaction product of diphenylmethane diisocyanate (MDI) and a hydroxy-terminated conjugated diene polymer having a molecular weight of at least 2,000, the MDI comprising at least 20% 2,4'-MDI isomer.

11. A prepolymer composition, the composition being solvent-free and substantially clear, the prepolymer being a urethane prepolymer, the urethane prepolymer having an isocyanate group content of 16–17 weight percent and a viscosity at 25° C. of no more than 3,000 mPa.s, the urethane prepolymer being the reaction product of diphenylmethane diisocyanate (MDI) and a hydroxy-terminated conjugated diene polymer having a molecular weight of at least 2,000, the MDI comprising at least 20% 2,4'-MDI isomer.

12. A process for a preparing a solvent-free urethane prepolymer composition which has an excess of isocyanate groups and which remains substantially clear at ambient temperature storage, the process comprising reacting a hydroxy-terminated polymer of a conjugated diene with diphenylmethane diisocyanate (MDI), at a temperature of about 100° C. or less, the MDI comprising at least 20% 2,4-MDI isomer.

13. A process as in claim 12 wherein said hydroxy-terminated diene polymer is a hydroxy-terminated polybutadiene.

14. A process as in claim 13 wherein the molecular weight of said hydroxy-terminated polybutadiene polymer is about 1000 to 5000.

15. A process as in claim 12 wherein said MDI comprises at least 22% 2,4'-MDI.

16. A process as in claim 15 wherein said MDI comprises at least 30% 2,4'-MDI.

17. A process as in claim 12 wherein said excess isocyanate groups are present at a level of at least 2.5 % by weight of the prepolymer composition.

18. A process as in claim 17 wherein said excess isocyanate groups are present at a level of at least 10% by weight.

19. A process as in claim 12 wherein said reaction temperature is 70°–100° C.

20. A process for reducing pearlescence in a pearlescent isocyanate functional urethane prepolymer composition, the prepolymer being a reaction product of a hydroxy-terminated diene polymer and a diphenylmethane diisocyanate (MDI) having less than 20% 2,4'-MDI, the process comprising adding to the prepolymer composition at a temperature of 100 ° C. or less a sufficient amount of an MDI having greater than 20% 2,4'-MDI isomer to bring the final content of 2,4'-MDI, based on total MDI used in the prepolymer composition, to a level of at least 20%.

21. A process as in claim 20 wherein said final 2,4'-MDI content is at least 22%.

22. A process as in claim 21 wherein said final 2,4'-MDI content is at least 30%.

23. A prepolymer composition as in claim 1 wherein said MDI is a mixture of 4,4'— and 2,4'— isomers of diphenylmethane diisocyanate.

* * * * *